May 6, 1930.  F. STREICH  1,757,099
DOUGH DIVIDER
Filed July 29, 1929  2 Sheets-Sheet 1

Inventor:
Frank Streich,
by Charles O. Shervey
his Atty.

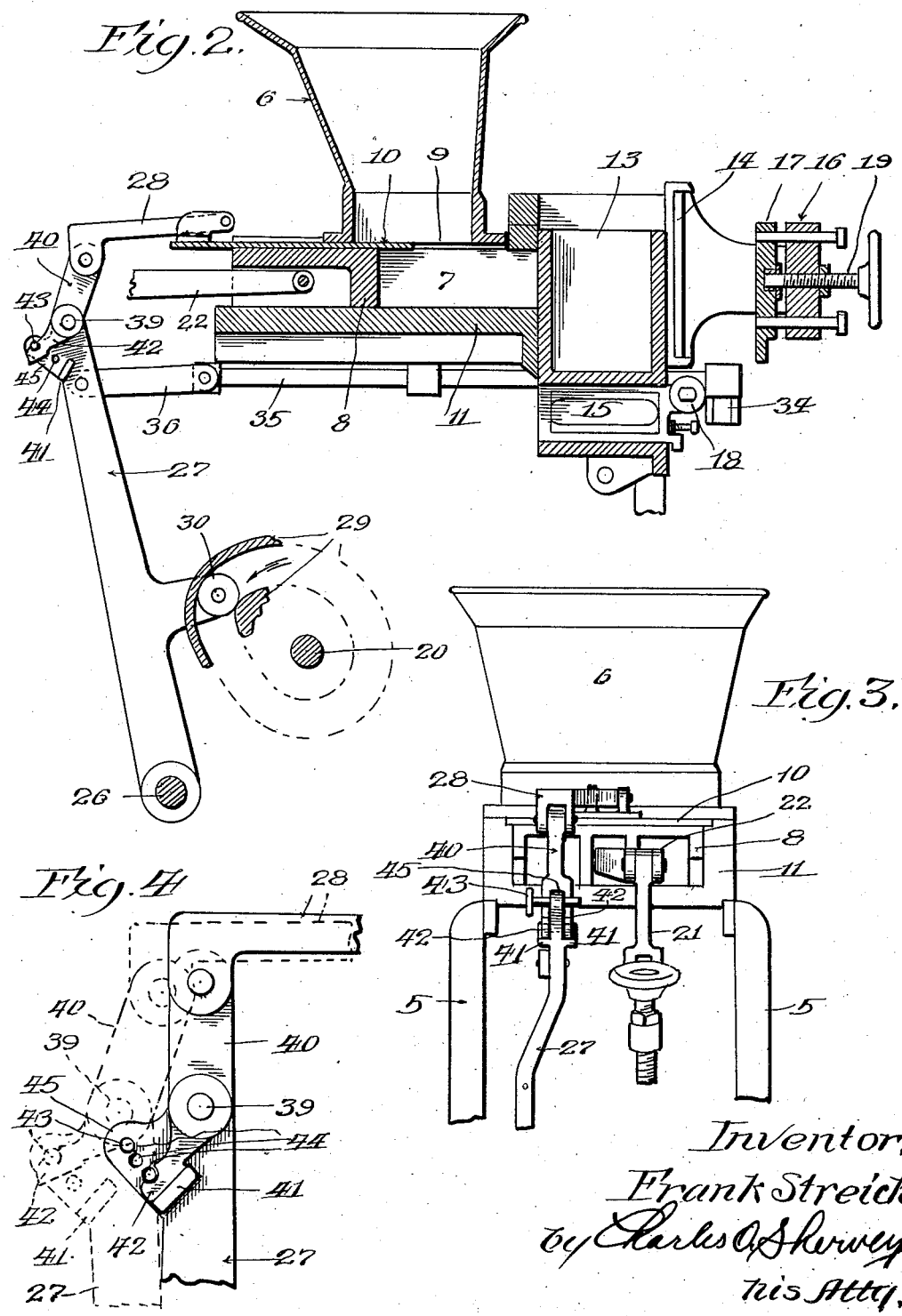

Patented May 6, 1930

1,757,099

UNITED STATES PATENT OFFICE

FRANK STREICH, OF JOLIET, ILLINOIS, ASSIGNOR TO UNION MACHINERY COMPANY, OF JOLIET, ILLINOIS, A CORPORATION OF ILLINOIS

DOUGH DIVIDER

Application filed July 29, 1929. Serial No. 381,769.

This invention relates to dough dividers, and more particularly to dough dividers of that type which employs a receiving chamber in which a quantity of dough is received from a hopper and forced into a measuring pocket. A dough divider of this type is more fully shown and described in my prior patent on dough dividers, No. 1,599,805, issued November 3, 1925, to which reference is hereinafter made.

The principal object of the present invention is the provision of novel means for regulating the amount of dough taken into the dough receiving chamber. In the type of machine forming the subject matter of this specification, the capacity of the measuring pocket may be altered for the purpose of accurately measuring the quantity of dough for loaves of bread or buns of various sizes or weights. To enable the correct amount of dough, or substantially the correct amount to be taken into the dough receiving chamber from the hopper, provision must be had for varying the amount so as to correspond with that forced into the measuring pocket. In the past, considerable difficulty has been encountered in handling soft and hard dough, and one of the objects of the present invention is to provide means by which hard and soft dough may be handled with equal facility.

With these and other objects and advantages in view, this invention consists in a dough divider having means for regulating the size of the opening or passageway between the hopper and the dough receiving chamber and which is usually controlled by a member termed a "knife". It further consists in the provision of regulating means interposed between the knife actuating means and knife to thereby vary the backward or opening movement of the knife without varying the forward or closing movement thereof. It further consists in a dough divider in which regulatable means are provided for the knife and for the plunger which charges the dough into the measuring pocket, whereby the amount of dough taken into the receiving chamber may be varied to correspond with the amount forced into the measuring pocket.

The invention further consists in the several novel features of construction, arrangement and combination of parts hereinafter fully set forth.

The invention is clearly illustrated in the drawings accompanying this specification in which—

Fig. 2 is a fragmental view of the dough handling mechanism illustrated in Fig. 1, but showing the parts in a different position;

Fig. 3 is a fragmental end elevation looking in the direction of the arrow 3 in Fig. 1; and Fig. 4 is an enlarged fragmental view illustrating the regulating means between the knife actuating mechanism and the knife.

Figure 1:
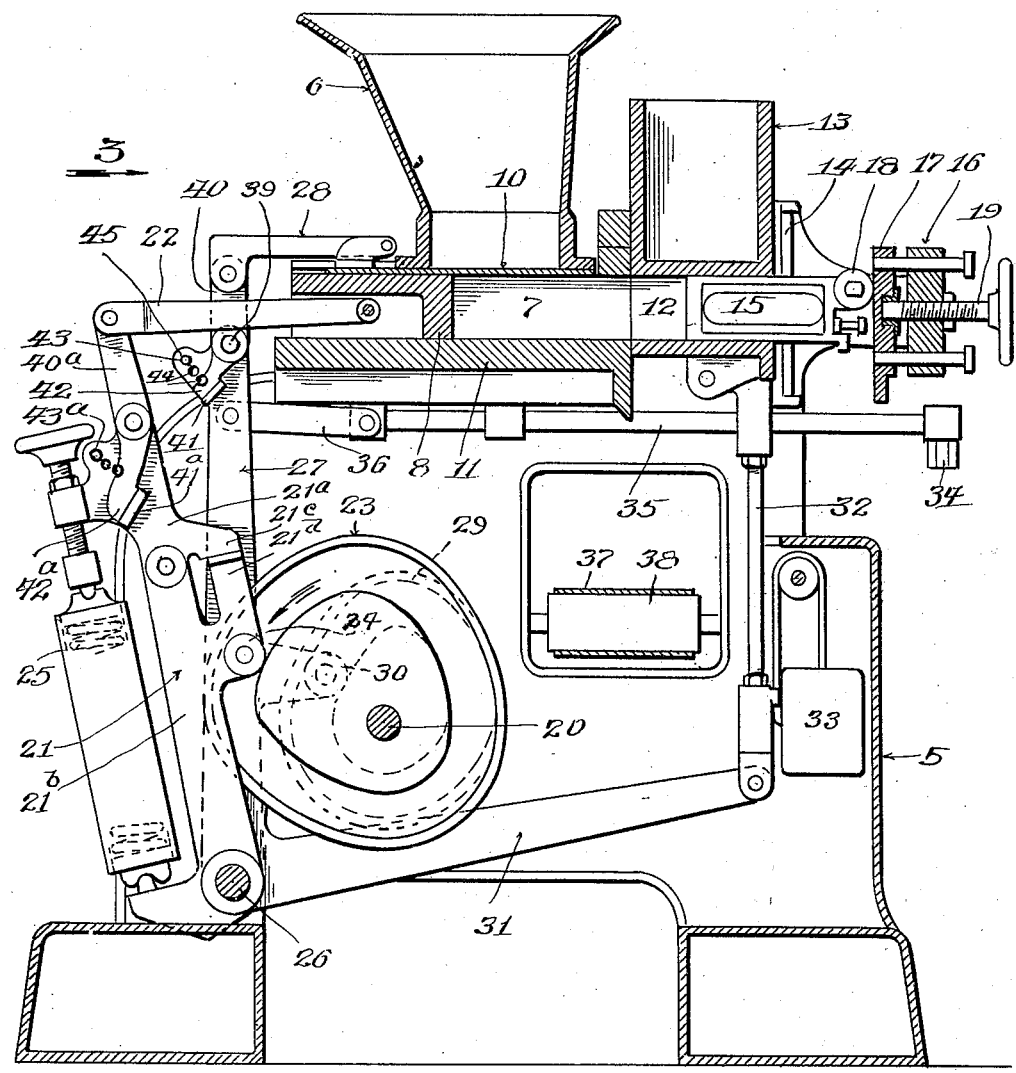
Figure 1 is a view, partly in side elevation and partly in vertical longitudinal section, through a dough divider embodying a simple form of the present invention.

Referring to said drawings, which illustrate a simple embodiment of the present invention applied to a dough divider of the type illustrated in the patent above referred to, the reference character 5 designates a frame of substantial construction, on the top of which is supported a hopper 6 in which the dough is received from a place located above the machine. Below the hopper is a dough receiving chamber 7, usually rectangular in cross section, in which reciprocates a charging plunger 8 which forces the dough from the receiving chamber 7 into the measuring pocket, hereinafter described, and compresses it therein. Between the hopper 6 and the receiving chamber 7 is an opening 9 through which the dough passes from the hopper to the receiving chamber, and said opening 9 is controlled by a flat plate 10, hereinafter called a knife, which reciprocates back and forth above the plunger 8 and opens and closes the opening 9. The receiving chamber 7 is formed in a horizontally disposed member 11 which is bolted or otherwise secured to the frame 5.

At the discharge end of the receiving chamber 7 is a measuring pocket 12 which is formed in a movable head 13, here shown as slidably mounted in guides 14 carried by the frame of the machine. For the purpose of discharging the dough from the measuring pocket 12, the head 13 is reciprocated in a vertical direction after the dough has been charged into the pocket.

An ejecting plunger 15 is slidably mounted in the measuring pocket 12 and forms an adjustable wall for one end of the pocket. The usual adjustment mechanism 16 is provided for the plunger 15, which mechanism contains an abutment plate 17 against which a roller 18, carried by the ejecting plunger 15, bears when the dough is being charged into the measuring pocket. An adjustment stud 19 threaded in the support of the adjustment means is provided as usual, for adjusting the abutment plate 17 to vary the capacity of the measuring pocket 12, as is well understood.

Actuating mechanism is provided for the dough handling members above described, and in the type of machine described, said mechanism is operated from a main shaft 20 journaled in suitable bearings mounted on the frame of the machine. Usually the actuating mechanism for the plunger 8 comprises an operating lever 21, carried by a shaft or rod 26, and connected at its upper end to the plunger by a link 22 and receiving its motion from a suitably shaped cam 23 mounted on the drive shaft 20. The lever 21 carries a roller 24 which travels in the cam groove of the cam 23, as is customary. As a preference, said lever 21 is formed of jointed arms 21$^a$ and 21$^b$, formed with stop shoulder 21$^c$ and 21$^d$, and provided with a compression spring 25 between the two arms for obtaining a cushioning effect upon the dough when compressing the same, as is customary. The shaft 26 upon which the operating lever 21 is carried is mounted in the frame of the machine.

An operating lever 27 also carried by the shaft 26 and connected at its upper end to the knife 10 by a link 28 reciprocates said knife in timed relation to the movements of the plunger 8. A cam 29 mounted upon the main drive shaft 20 and co-operating with a roller 30 carried by the operating lever 27, serves to oscillate the lever 27 and therewith reciprocates the knife 10 in timed relation to the movements of the plungers 8.

A lever 31 also carried by the shaft 26 and co-operating with a cam on the drive shaft 20, reciprocates the head 13 in timed relation to the movements of the plunger 8. The lever 31 is connected to the head 13 by a link 32 and may be provided with a counterweight 33 to facilitate the operation of the head 13.

An arm 34, mounted on a rod 35 connected to the operating lever 27 by a link 36, is provided for moving the ejecting plunger 15 in a direction to discharge the measured lumps of dough from the measuring pocket 12, and said mechanism is timed to move the ejecting plunger when the head 13 reaches the lower limit of its travel. A conveyor belt 37, trained around a roller 38 carried by the frame of the machine, is provided for receiving the lumps of dough after being discharged from the measuring pocket 12 and carrying them away to other mechanism for subsequent operations.

As in the machine of the patent above referred to, suitable mechanism may be provided for dividing the lump of dough measured in the pocket 12 into individual lumps, but as this mechanism forms no part of the present invention, it will not be described in detail. The mechanism thus far described is substantially the same as that shown and described in the prior patent above referred to.

As has been set forth above, the capacity of the measuring pocket 12 may be varied to receive the required amount of dough for the manufacture of loaves of bread or buns of various sizes or weights. When the capacity of the measuring pocket is changed, it becomes necessary to vary the amount of dough taken into the receiving chamber 7, and in order to accomplish this, means are provided for varying the size of the opening 9 between the hopper 6 and receiving chamber 7, which will now be described.

Regulatable lost motion means are provided between the operating lever 27 and the knife 10 whereby the backward movement of said knife in uncovering the opening 9 between the hopper 6 and receiving chamber 7 may be varied without varying the forward movement of the knife in closing said opening. In the form of the invention illustrated, the upper end of the operating lever 27 is jointed as at 39, thereby providing an arm 40 which may have a limited amount of lost motion when the operating lever 27 is moved in the direction to uncover the opening 9.

The main portion of the lever 27 is formed with stop shoulders 41 projecting laterally from the sides of the lever, and the arm 40 has a bifurcated extension 42 on the opposite side of the joint with the main portion of the lever 27, which extension is arranged to abut against the stop shoulders 41 whenever the lever 27 is moved in the direction to close the opening 9. Adjustable means are provided for permitting movement of the extension 42 of the arm 40 away from the stop shoulders 41 through a limited extent, and, as shown, said means here shown comprise a pin 43 which may be placed in any one of a series of holes 44 contained in a lug 45 formed on the main portion of the lever 27.

If desired, the connection between the operating lever 21 and the plunger 8 may be formed with regulatable lost motion means similar to that shown in connection with the operating lever 27. In the drawing, the upper end of the member 21$^a$ of the operating lever 21 is shown as provided with an arm 40ª jointed with the main portion of the lever and having an extension 42ª capable of a limited amount of movement between stop shoulders 41ª and a pin 43ª.

In the operation of the mechanism, forming the subject matter of this specification, the knife 10 covers the opening 9 during the charging stroke of the plunger 8, which position of the parts is seen in Fig. 1. After dough, contained in the receiving chamber 7, has been charged into the pocket 12, the head 13 is moved down and the dough discharged from the pocket, and before the head 13 reaches the upper limit of the stroke, the plunger and knife are moved backward by the cam mechanism to permit the chamber 7 to receive another charge, the knife 10 uncovering or partially uncovering the opening 9, depending upon the adjustment of the regulating means for varying the backward stroke of the knife 10.

As shown in the drawings, the pin 43 is placed in the uppermost hole 44 of the operating lever 27, and, as a result, when the operating lever 27 is moved backwards, the joint 39 between the main portion of the lever 27 and arm 40 permits the upper end of the main part of the lever 27 to move through a limited distance without effecting the movement of the knife 10, and during said movement of the lever 27, it swings the arm 40 upon its pivotal connection with the link 28 until the extension 42 of the arm 40 engages with the pin 43, whereby the further movement of the operating lever 27 moves the arm 40 bodily with it, thereby retracting the knife 10. Because of the lost motion connection between the operating lever 27 and knife 10, the knife is moved through a lesser distance than it would be if the operating lever were connected to the link 28 without any lost motion between them. In Fig. 2, the operating lever 27 is shown at the limit of its backward stroke, the knife being only partially retracted, whereby the size of the opening 9 has been reduced considerably.

It will be seen, therefore, that during the backward or suction stroke of the plunger 8, a lesser amount of dough will be taken into the receiving chamber 7 than if the opening 9 were completely uncovered. The size of the uncovered portion of the opening is regulated by placing the pin 43 in the proper hole 44 in the lever 27, thus regulating the amount of dough taken into the dough receiving chamber to correspond with the amount charged into the measuring pocket.

When the regulating means is provided in the operating lever 21 for the plunger 8, the backward movement or suction stroke of the plunger may be varied and various predetermined quantities of dough can thereby be taken into the receiving chamber 7 so as to correspond to the amount required to be forced into the measuring pocket 12. By providing the regulating means for the plunger, as well as for the knife, the quantity of dough taken into the receiving chamber may be varied with considerable accuracy. It will be understood that the size of the uncovered opening 9 is regulated to correspond with the adjustment made in the measuring pocket 12 and that when the measuring pocket is adjusted to receive a large lump, the size of the uncovered opening 9 is increased to correspond with the capacity of the measuring pocket.

During the backward movement of the plunger beyond the forward edge of the knife, a partial vacuum is produced in the receiving chamber 7 which facilitates movement of the dough from the hopper into said receiving chamber, and when operating on heavy dough, it is of importance that considerable suction be applied in the receiving chamber to bring the full amount of dough into it. To this end the regulatable means are provided between the plunger and its operating lever, whereby the suction stroke of the plunger may be increased relative to the backward stroke of the knife to thereby enable the receiving chamber to take in a predetermined full charge of dough. When used on light dough the vacuum required is not so high and, consequently, the regulating device is set accordingly.

It will be observed that the knife 10 covers the plunger 8 at all times, thereby preventing dough from lodging upon the upper surface of the plunger when being admitted to the dough receiving chamber. The upper face of the plunger is, therefore, kept free from dough which would otherwise interfere with its perfect operation.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new, and desire to secure by Letters Patent:

1. In a dough divider, the combination of a hopper, a dough receiving chamber opening thereto, regulatable means for controlling the size of the opening between the hopper and dough receiving chamber, a member having a measuring pocket adapted to receive dough from said receiving chamber, means for regulating the capacity of said measuring pocket, a plunger adapted to operate in the dough receiving chamber and adapted on its rearward stroke to draw dough from the hopper into said measuring chamber and on its forward stroke to force dough from said chamber into said measuring pocket, and means for actuating said plunger.

2. In a dough divider, the combination of a hopper, a dough receiving chamber opening thereto, a movable plate controlling the opening between the hopper and dough receiving chamber, means for actuating said plate, including regulating means for varying the length of stroke of said plate, a member having a measuring pocket, a plunger in said receiving chamber, and means for actuating said plunger.

3. In a dough divider, the combination of a hopper, a dough receiving chamber communicating therewith, a movable plate for covering and uncovering the passage between the hopper and dough receiving chamber, plate actuating mechanism including regulatable means for varying the backward movement of the plate, a member having a measuring pocket, a reciprocable plunger in said dough receiving chamber, a lever for actuating the plunger, and means for moving the lever.

4. In a dough divider, the combination of a hopper, a dough receiving chamber communicating therewith, a reciprocable knife for controlling the passage between the hopper and dough receiving chamber, a knife actuating lever, there being regulatable means between said lever and knife for varying the backward stroke of the knife, a plunger in said dough receiving chamber, and means for operating said plunger.

5. In a dough divider, the combination of a hopper, a dough receiving chamber communicating therewith, a reciprocable knife controlling the passage between the hopper and dough receiving chamber, a knife actuating lever connected to said knife and having a jointed arm capable of a limited amount of lost motion, and lever operating means.

6. In a dough divider, the combination of a hopper, a dough receiving chamber communicating therewith, a knife for controlling the passage between said hopper and dough receiving chamber, an operating lever connected to said knife and having a jointed arm capable of a limited amount of lost motion, and means for varying the amount of said lost motion.

7. In a dough divider, the combination of a hopper, a dough receiving chamber communicating therewith, a knife for controlling the passage between said hopper and dough receiving chamber, an operating lever connected to said knife and having a jointed arm capable of a limited amount of lost motion, and stop members for limiting the amount of lost motion, one of said stop members being adjustably mounted.

8. In a dough divider, the combination of a hopper, a dough receiving chamber communicating therewith, a knife controlling the passage between said hopper and dough receiving chamber, knife operating mechanism, including a lost motion element for varying the length of a stroke of said knife, a plunger in said dough receiving chamber, plunger actuating mechanism, a member having a dough measuring pocket, and means for varying the capacity of said pocket.

9. In a dough divider, the combination of a hopper, a dough receiving chamber communicating therewith, a knife for controlling the size of the opening between said hopper and dough receiving chamber, knife actuating mechanism including means for varying the stroke of said knife, a plunger in said dough receiving chamber, plunger actuating means, a vertically reciprocable member having a dough measuring pocket therein, and means for varying the capacity of said measuring pocket.

10. In a dough divider, the combination of a hopper, a dough receiving chamber communicating therewith, a member having a dough measuring pocket, means for varying the capacity of said pocket, a reciprocable plunger in said dough receiving chamber, a lever connected to said plunger and formed with a jointed arm having a limited amount of lost motion whereby the backward stroke of the plunger may be varied without varying the forward stroke thereof.

11. In a dough divider, the combination of a hopper, a dough receiving chamber communicating therewith, a member having a measuring pocket, means for varying the capacity of said measuring pocket, a knife for controlling the opening between the hopper and dough receiving chamber, a plunger reciprocating in said chamber, operating mechanism for said knife, and operating mechanism for said plunger, both including lost motion elements, whereby the backward strokes of the knife and plunger may be varied without varying the forward strokes thereof.

12. In a dough divider, a knife for controlling the passage between a hopper and a dough receiving chamber, an operating lever for said knife, and a link connecting said operating lever with said knife, said operating lever having a jointed member provided with a regulatable amount of limited lost motion.

13. In a dough divider, the combination of a hopper, a dough receiving chamber communicating therewith, a knife for controlling the size of the opening between said hopper and dough receiving chamber, knife actuating mechanism including means for varying the backward stroke of the knife, a plunger in said dough receiving chamber, plunger actuating mechanism including means for varying the back stroke of the plunger beyond the opening controlled by the knife, a member having a dough measuring pocket, and means for varying the capacity of said pocket.

14. In a dough divider, the combination of a hopper, a dough receiving chamber communicating therewith, a knife for controlling the size of the opening between said hopper and dough receiving chamber, knife actuating mechanism, regulating means between the knife and knife actuating mechanism for varying the backward stroke of the knife, a plunger in said dough receiving chamber, plunger actuating mechanism, and regulating means between said plunger and its actuating mechanism for varying the backward stroke of the plunger beyond the opening uncovered by the knife, whereby the suction created by said backward movement of the knife beyond the opening may be varied.

15. In a dough divider, the combination of a dough receiving chamber having a regulatable inlet opening, a regulatable dough measuring pocket, a plunger reciprocating in said dough receiving chamber and operating to create a partial vacuum therein, and means for varying the amount of vacuum produced in proportion to the size of the regulatable inlet opening.

FRANK STREICH.